(12) United States Patent
Yandle, II

(10) Patent No.: US 6,382,233 B1
(45) Date of Patent: May 7, 2002

(54) PLASTIC HYDRAULIC HAMMER REDUCTION SYSTEM

(76) Inventor: S. Elwood Yandle, II, 5883 Rhodes Ave., New Orleans, LA (US) 70131

( * ) Notice: Subject to any disclaimer, the term of this patent is extended or adjusted under 35 U.S.C. 154(b) by 0 days.

(21) Appl. No.: 09/596,439

(22) Filed: Jun. 19, 2000

Related U.S. Application Data

(60) Provisional application No. 60/139,965, filed on Jun. 18, 1999.

(51) Int. Cl.$^7$ .......................... F16K 17/40; F16K 47/02; B61D 5/00
(52) U.S. Cl. ..................... 137/68.23; 137/347; 137/590; 138/42; 251/127
(58) Field of Search .................. 105/358; 137/68.19, 137/68.23, 347, 561 A, 590; 138/42; 251/127; 410/68

(56) References Cited

U.S. PATENT DOCUMENTS

| | | | | |
|---|---|---|---|---|
| 4,251,005 A | * | 2/1981 | Sons et al. ................. | 105/360 |
| 4,549,718 A | * | 10/1985 | Seger ......................... | 251/127 |
| 4,840,192 A | | 6/1989 | Yandle, II ................... | 137/681 |
| 4,938,247 A | | 7/1990 | Yandle, II ................... | 137/68.1 |
| 5,465,753 A | * | 11/1995 | Schwartz .................... | 127/587 |
| 5,785,078 A | | 7/1998 | Burian et al. ............... | 137/350 |
| 5,830,515 A | * | 11/1998 | Pleasant et al. ............. | 138/42 |
| 6,076,471 A | * | 6/2000 | Burain et al. ............... | 105/358 |

* cited by examiner

Primary Examiner—Michael Powell Buiz
Assistant Examiner—Ramesh Krishnamurthy
(74) Attorney, Agent, or Firm—Garvey, Smith, Nehrbass & Doody, L.L.C.

(57) ABSTRACT

A mobile tank car or like vehicle includes a mechanical hydraulic dampening device having kinetic energy dissipating baffles in its interior with no moving parts. The moving tank car carrying a liquid load, such as for example a railroad tank car, including a rupture disc assembly or a safety relief valve at the top of the tank to prevent fracturing of the tank due to excessive pressure. The dampening device is located in line between the rupture disk assembly or safety valve and the liquid load. When the tank is suddenly moved, the shifting liquid load passes through the pipe-like device, impacting against impact surfaces of a baffle, causing its energy and the hydraulic hammer action to be dissipated. In most, if not all, cases the presence of the mechanical baffling device prevents the rupture disk and/or safety relief valve from prematurely operating, by maintaining the hydraulic hammer action down to acceptable limits, preventing the spilling of any of the liquid load which otherwise would have occurred through the rupture disk and/or safety relief valve. The device is relatively small, occupying and extending into far less than 1% of the total tank capacity. The dampening device is of a plastic material having a specially configured body that includes a plastic core with opposed surfaces each carrying a plurality of baffles.

43 Claims, 9 Drawing Sheets

PLASTIC HYDRAULIC HAMMER REDUCTION SYSTEM

CROSS-REFERENCE TO RELATED APPLICATIONS

Priority of U.S. Provisional Patent Application Ser. No. 60/139,965, filed Jun. 18, 1999, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to hydraulic hammer reduction systems for vehicles such as railroad tank cars and the like. More particularly, the present invention relates to an improved hydraulic hammer reduction system that includes a plastic element disposed in an outlet tube at the upper end of the vehicle, said element being comprised of a series of spaced apart curved baffles affixed to opposite sides of an elongated body.

2. General Background of the Invention

Moving vehicles carrying a liquid load in a tank, such as for example railroad tank cars, when carrying liquids, must cope with problems associated with hydraulic hammer action, a phenomenon which occurs when a liquid in a confined area is subjected to an abrupt increase or decrease in speed.

Vehicles such as railroad tank cars are typically equipped with a safety vent nozzle and a device called a rupture disk. The rupture disk which is affixed to the top of the safety vent nozzle is used to seal the tank car under normal conditions. In events [such as fires] that can cause an increase of the internal pressure of a tank car, the rupture disk is designed to burst allowing the internal pressure to vent to the ambient. Once burst the excess pressure is relieved, protecting the tank car from a catastrophic failure, and complete loss of the product inside to the ambient.

The hydraulic hammer action created by the abrupt change in speed, mentioned earlier, is sufficient to travel up the safety vent nozzle and break the rupture disk. This allows a non-accident release of the product contained in the tank car. This release will cause unnecessary damage to the environment, the tank car, and injury to a person standing close to the tank car.

The rationale in utilizing such a system was that it was better to incur the relatively minor expense and danger associated with disk replacement and a minor spill than to have incurred the extensive expense and danger of tank car fracture and/or a major spill. However, as indicated, this has been far from a satisfactory solution and situation.

The hydraulic hammer reduction systems shown in U.S. Pat. Nos. 4,840,192 and 4,938,247 do function well; however, the baffles shown in those patents must be made of metal, as they are too weak if they are made of plastic. A safety vent for a railroad car which contains a surge protection is disclosed in U.S. Pat. No. 5,785,078. The following U.S. Patents are incorporated herein by reference: U.S. Pat. No. 4,840,192; 4,938,247; 5,785,078; and all referenced cited in those patents.

BRIEF SUMMARY OF THE INVENTION

The apparatus of the present invention solves the problems confronted in the art in a simple and straightforward manner. What is provided is a hydraulic hammer reduction system, similar to that shown in U.S. Pat. Nos. 4,840,192 and 4,938,247, but an improved design with baffles shaped such that they can be made of plastic, yet still be strong enough to absorb mechanical energy without breaking. Preferably the baffles are made of plastic.

The present invention provides a vehicle for transporting a liquid commodity that includes a closed tank having an inside surface, an outside surface, a top, a bottom and an interior for containing a liquid commodity. A safety vent is mounted on the top of the tank on the outside surface and having a safety relief valve for allowing pressure to escape from the tank in the event of a pressure build up greater than the tank is rated for and before the tank can fracture.

The present invention provides a mechanical energy dissipation system for dissipating hydraulic hammer action in the safety vent. The apparatus includes a mechanical device of relatively small size in comparison to the size of the tank, the device being located in the line of flow between the valve and the liquid load in the tank. The device presents a series of diverging, impact surfaces to the liquid flow from the tank to the rupture disk, for dissipating the hydraulic hammer action of the liquid as it flows through the device.

The diverging impact surfaces are made of a non-metallic plastic material such that they are strong enough to absorb mechanical energy without breaking.

The mechanical device occupies less than and extends into less than about 1% of the interior volume of the tank.

The mechanical device preferably includes a one-piece plastic body having a core, and said diverging impact surfaces comprising a series of spaced apart baffles placed in succession and affixed to opposite sides of the core and integral therewith. The body projects into the tank car and out of the tank car leading to the valve assembly.

The baffles are preferably a series of spaced apart plates.

Each of the plates is preferably defined by a pair of surfaces that form an angle with each other that is preferably an acute angle.

The baffles preferably have a pair of surfaces that form an angle of between 0 and 60° degrees with each other.

The present invention also provides a method of dissipating the hydraulic hammer action in a safety vent of a moving tank carrying a liquid load, such as for example, a railroad car, having a rupture disk assembly or safety relief valve.

The method includes providing a relatively small, mechanical energy dissipation device having a series of diverging, impact surfaces for dissipating hydraulic hammer action in the moving tank car. As part of the method, the mechanical device is attached in line between the liquid and the tank and the rupture disk of the rupture disk assembly causing any liquid to have passed through the mechanical device before it can reach the rupture disk.

In the method of the present invention, the device occupies less than and extends into less than about 1% of the interior volume of the tank.

With the method of the present invention, the kinetic energy of the moving liquid is dissipated as it passes through the mechanical device impacting against the diverging surfaces of the mechanical device and thereby dissipating the hydraulic hammer action.

With the method of the present invention, the diverging, impact surfaces are of a non-metallic, plastic material.

With the method of the present invention, the impact surfaces are strong enough to absorb mechanical energy without breaking.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
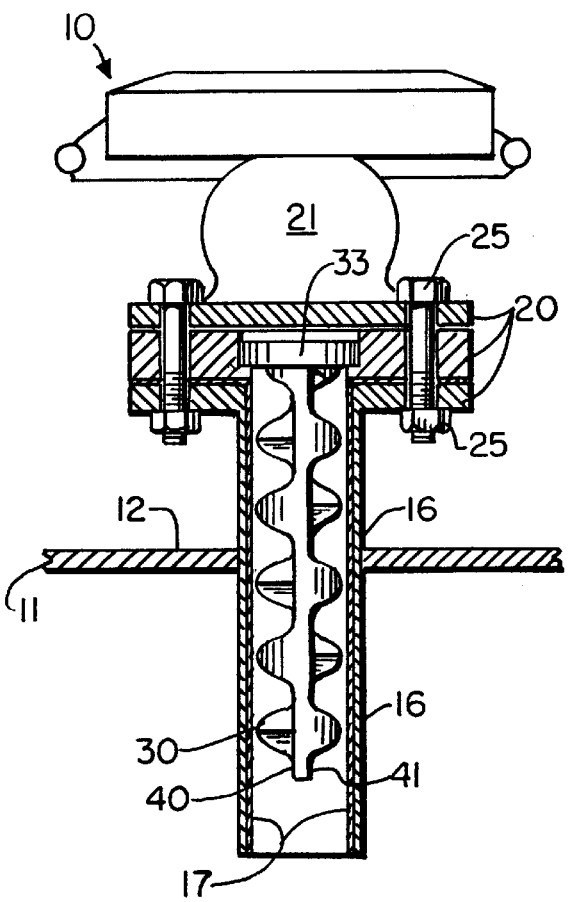
FIG. 1 is a sectional, elevational view of the preferred embodiment of the apparatus of the present invention.
Figure 4:
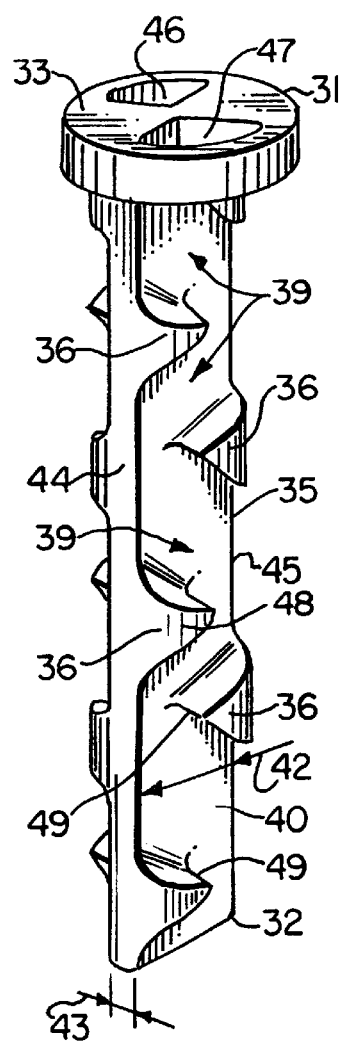
FIG. 4 is a partial, perspective view of the preferred embodiment of the apparatus of the present invention.
Figure 3:
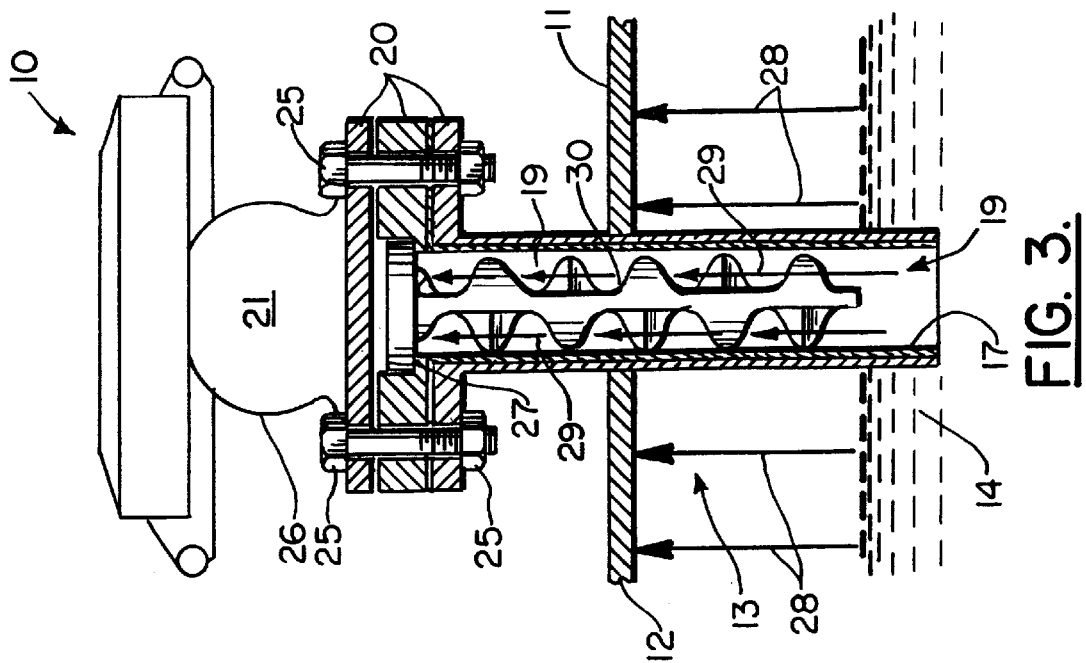
FIG. 3 is a sectional, elevational view of the preferred embodiment of the apparatus of the present invention.
Figure 2:
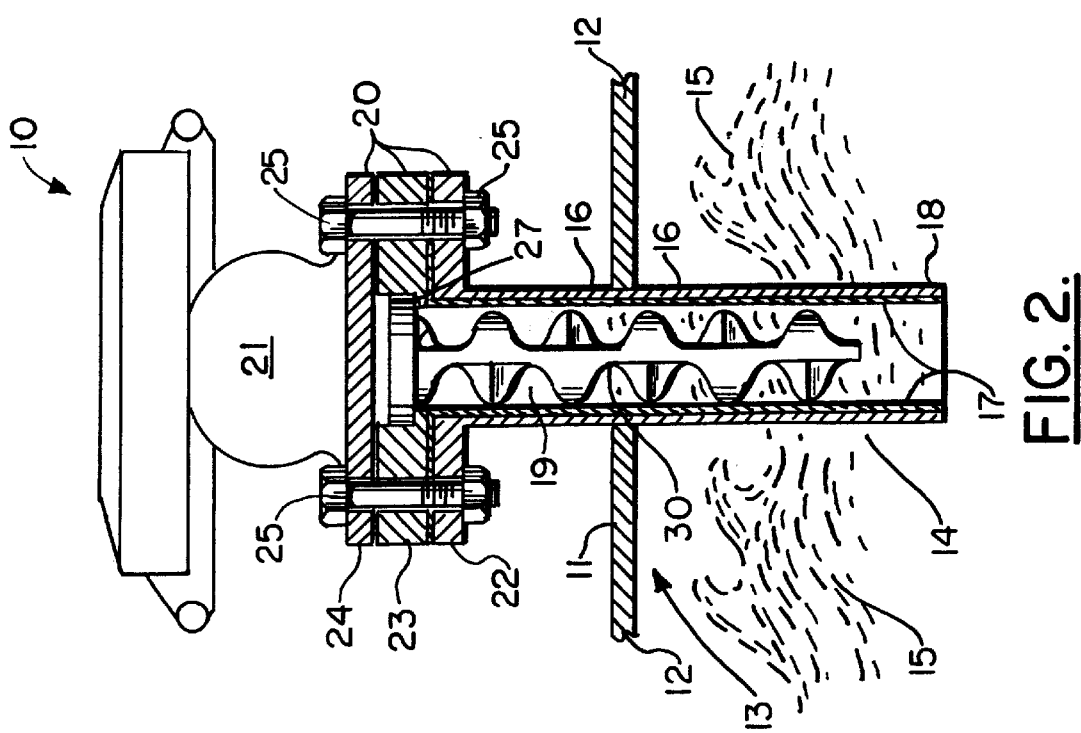
FIG. 2 is another sectional, elevational view of the preferred embodiment of the apparatus of the present invention.

FIGS. 1–3 show the preferred embodiment of the apparatus of the present invention designated generally by the numeral 10. Tank car 10 includes a tank 11 having a tank wall 12 that can be generally cylindrically shaped with dished end portions. Tank car 10 can be for example, a common railroad tank car.

The tank 11 has an interior 13 for containing a liquid commodity 14. The liquid commodity 14 is subjected to surges and wave action such as indicated by the numeral 15 in FIG. 2, showing an irregular or wavy liquid surface. Further, the liquid commodity 14 can generate pressure if subjected excessive heat for example, as indicated by arrows 28 pressing against tank wall 12. Sometimes the combination of pressure, as indicated by arrows 28 and wave action or surge, as indicated by numeral 15, can cause liquid to be thrust directly against rupture disk assembly 21.

Rupture disk assembly 21 is designed to relieve tank pressure as indicated by arrows 28 due to excess pressure. In such a situation, the rupture disk assembly 21 has a commercially available rupture disk that ruptures, relieving the pressure. This rupture disk assembly 21 is designed to relieve tank pressure at a value well below the rated burst pressure of the tank 11. However, the rupture disk assembly 21 is not designed to resist breakage or fracture if subjected to wave action 15 or liquid surge that can occur during transport as the tank is subjected to acceleration, deceleration, inclines and the like.

Figure 5:
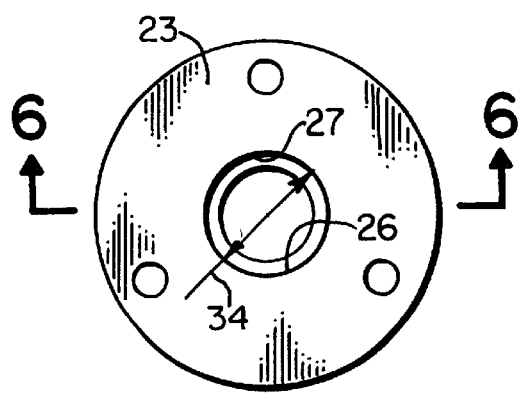
FIG. 5 is a partial, top view of the preferred embodiment of the apparatus of the present invention.
Figure 6:
FIG. 6 is a sectional view taken along lines 6—6 of FIG. 5.

The present invention provides a tank car 10 and related dissipation system that prevents surge from thrusting liquid against the rupture disk assembly 21. In FIGS. 1–3, an outlet fitting 16 is provided that extends through tank wall 11. Outlet fitting 16 is comprised of an inner cylindrical member 17 and an outer cylindrical member 18. A flanged connection 20 is used to connect rupture disk assembly 21 to the outlet fitting 17 using, for example, a bolted connection as shown in FIGS. 1–3. The flanged connection 20 can include annular flange 22, annular flange 24, and plastic mounting flange 23. A plurality of bolted connections 25 are provided for holding the three flanges 22, 23, 24 together. The flange 23 as shown in FIGS. 5 and 6 can be generally circular having a generally cylindrically shaped cavity 26 that includes an annular shoulder 27.

Figure 7:
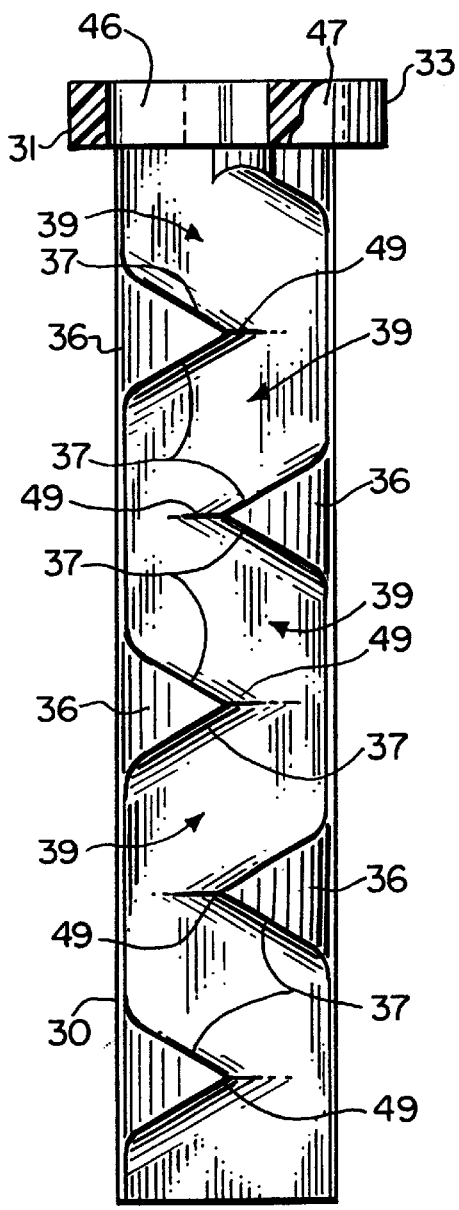
FIG. 7 is a partial, elevational view of the preferred embodiment of the apparatus of the present invention.
Figure 8:
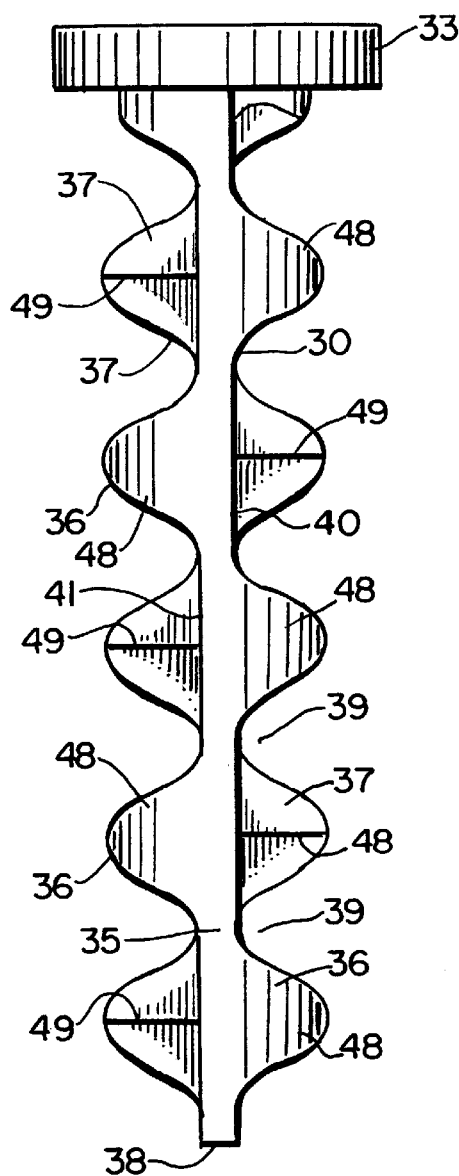
FIG. 8 is a partial side view of the preferred embodiment of the apparatus of the present invention.
Figure 9:
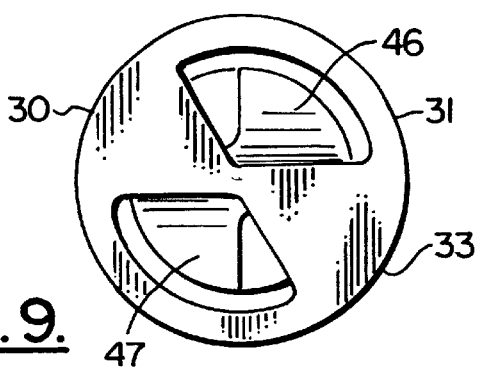
FIG. 9 is a partial top view of the preferred embodiment of the apparatus of the present invention.

The annular shoulder 27 of flange 23 receives cylindrical cap 33 of upper end 31 of plastic surge protector element 30. As shown in FIGS. 1–3, cylindrical cap 33 is generally cylindrically shaped, having an external diameter that is equal to the maximum internal diameter 34 of cavity 26. Core 35 can be an elongated member having opposed, generally flat surfaces 40, 41 that are of a thickness 42 that is much greater than the thickness 43 of edges 44, 45. The core 35 has upper end 31, lower end 32 and carries a plurality of baffles 36. Each baffle 36 is preferably a plastic member that can be integral with core 35. Each baffle 36 is defined by flat surfaces 37 that intersect at edge 49 to form an angle of between 0° and 60° degrees, preferably 30° degrees. Each baffle 36 also has curved surface 48. Passageways 39 extend between baffles 36 as shown in FIGS. 7–8. Each passageway 39 is generally U-shaped in cross section as shown in FIG. 8.

Figure 11:
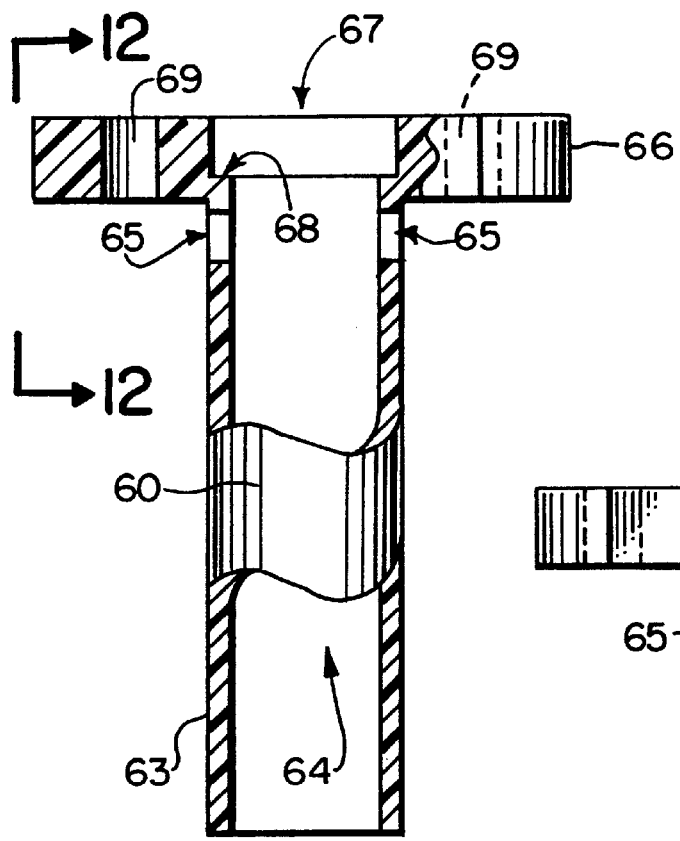
FIG. 11 is a sectional elevational view of the plastic receiver of FIG. 10.
Figure 12:
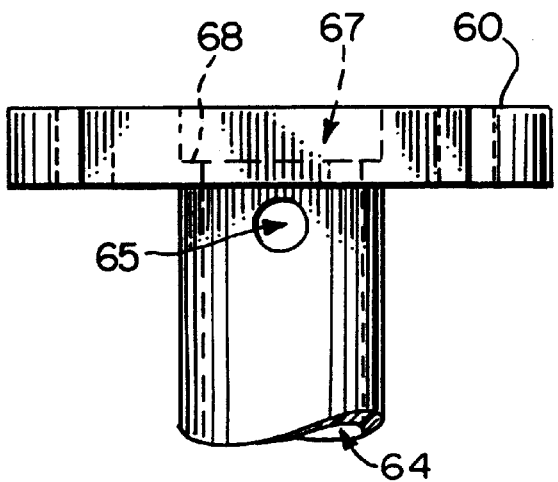
FIG. 12 is a sectional view taken along lines 12—12 of FIG. 11.
Figure 13:
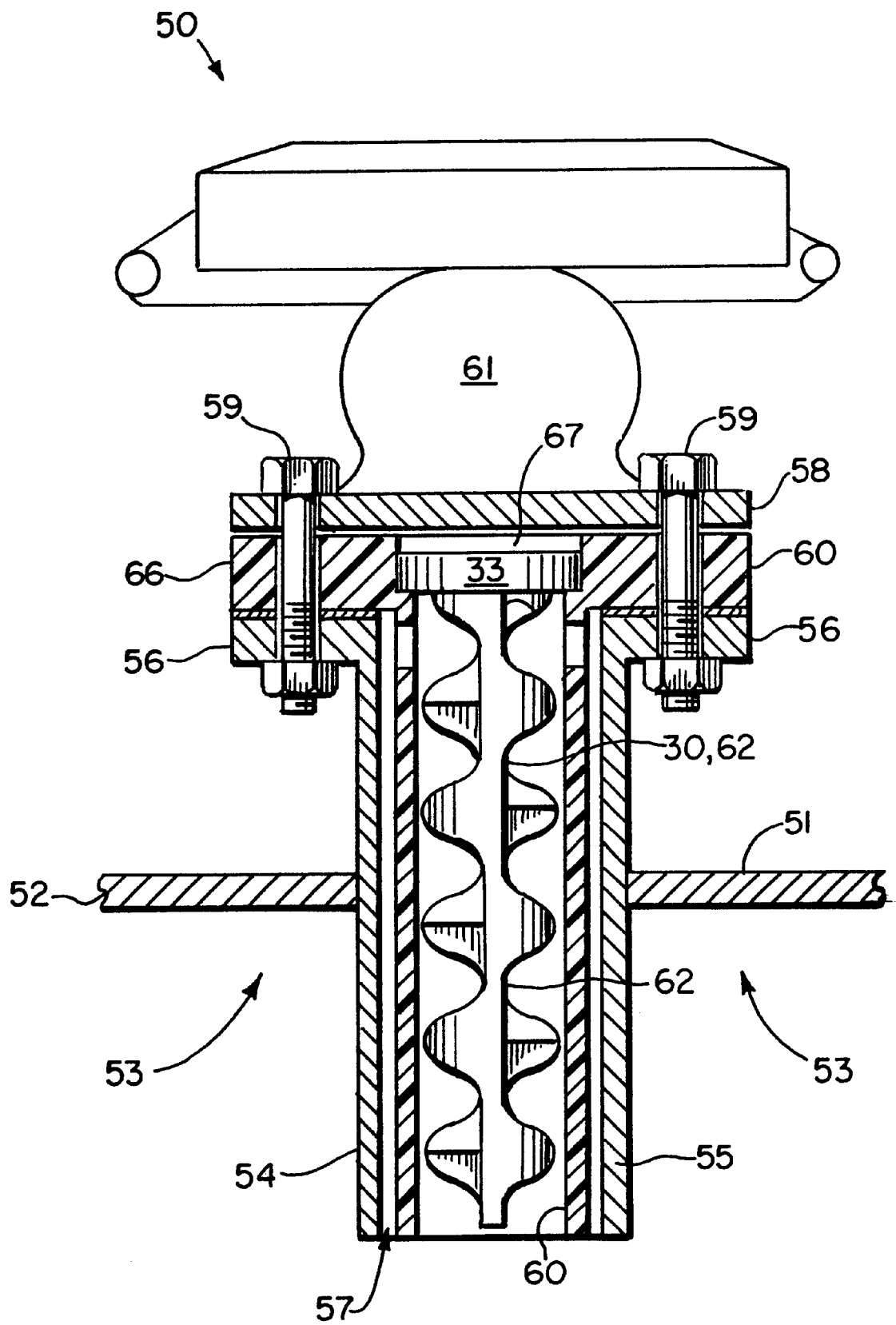
FIG. 13 is a sectional elevation view of a second embodiment of the apparatus of the present invention.

FIGS. 10–13 show a second embodiment of the apparatus of the present invention designated generally by the numeral 50 in FIG. 13. Tank car 50 includes a tank 51 having a cylindrical tank wall 52 and can be provided with dished ends not shown. Tank 51 has interior 53 and outlet fitting 54. Outlet fitting 54 includes a cylindrical wall portion 55 having an annular flange 56 at its upper end portion as shown in FIG. 13. Outlet fitting 54 provides a vertical bore 57. Plastic receiver 60 fits vertical bore 56 as shown in FIG. 13. The plastic receiver 60 has a flange 66 that fits on top of annular flange 56 of outlet fitting 54. An additional flange 58 fits on top of flange 66 as shown in FIG. 13, the assembly of annular flange 56, the flange 66 of plastic fitting 60 and the flange 58 being held together by bolted connections 59. Rupture disk assembly 61 is attached to and extends upwardly from flange 58, the construction of rupture disk assembly 61 and flange 58 is known in the art.

Figure 10:
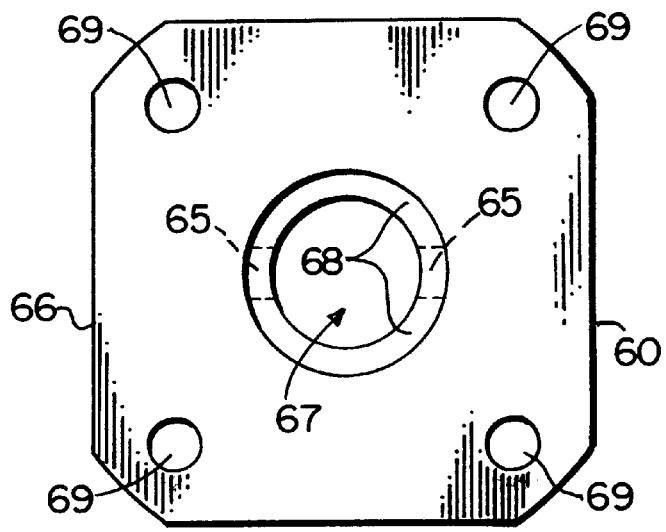
FIG. 10 is a top fragmentary view of an alternate embodiment of the apparatus of the present invention illustrating the plastic receiver portion thereof.

Plastic surge protector element 62 fits inside of plastic receiver 60. In FIGS. 10–12, plastic receiver 60 includes side wall 63, bore 64, and flange 66. Side wall 63 is provided with a pair of laterally spaced apart ports 65 next to flange 66. At flange 66, open ended socket 67 communicates with bore 64. Open ended socket 67 terminates at annular shoulder 68. The annular shoulder 68 provides a location that receives plastic surge protector element 62. It should be understood that the plastic surge protector element 62 can be of the same configuration, size and shape as the plastic surge protector element 30 shown and described with respect to FIGS. 1–9, providing a cylindrical cap such as cap 33 that fits open-ended socket 67. Flange 66 provides a plurality of openings 69 through which bolted connections 59 pass as shown in FIGS. 10, 11 and 13.

Figure 18:
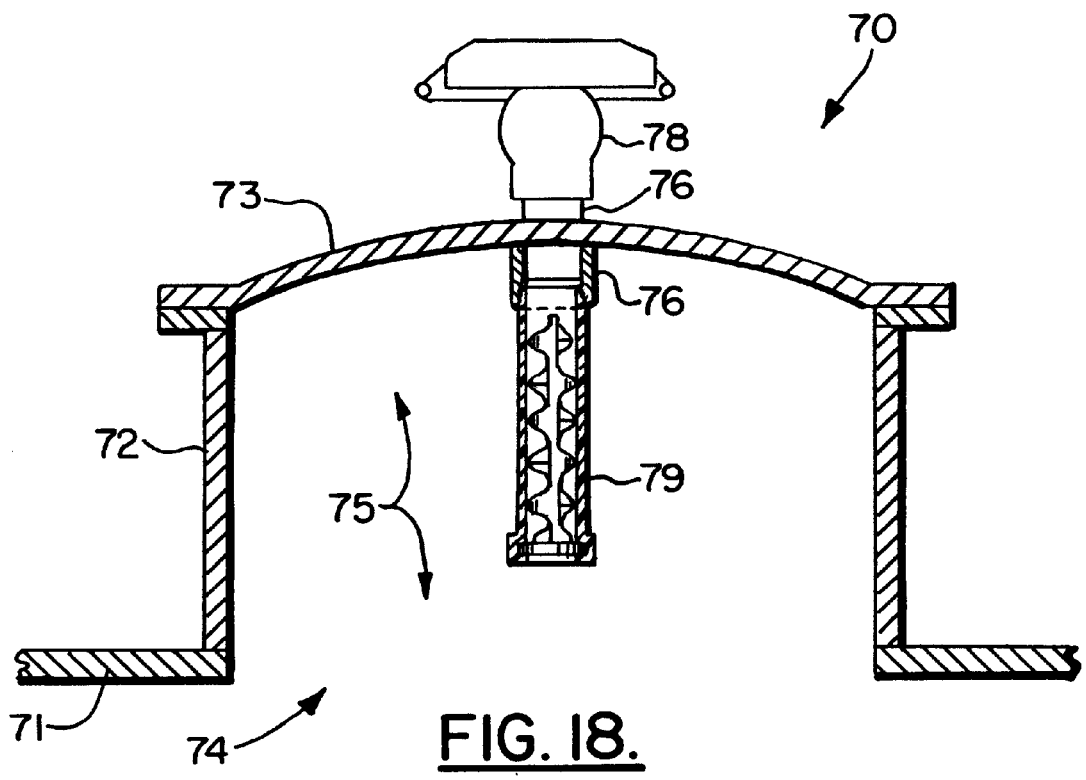
FIGS. 18 and 19 are section elevation views of the third embodiment of the apparatus of the present invention.
Figure 19:
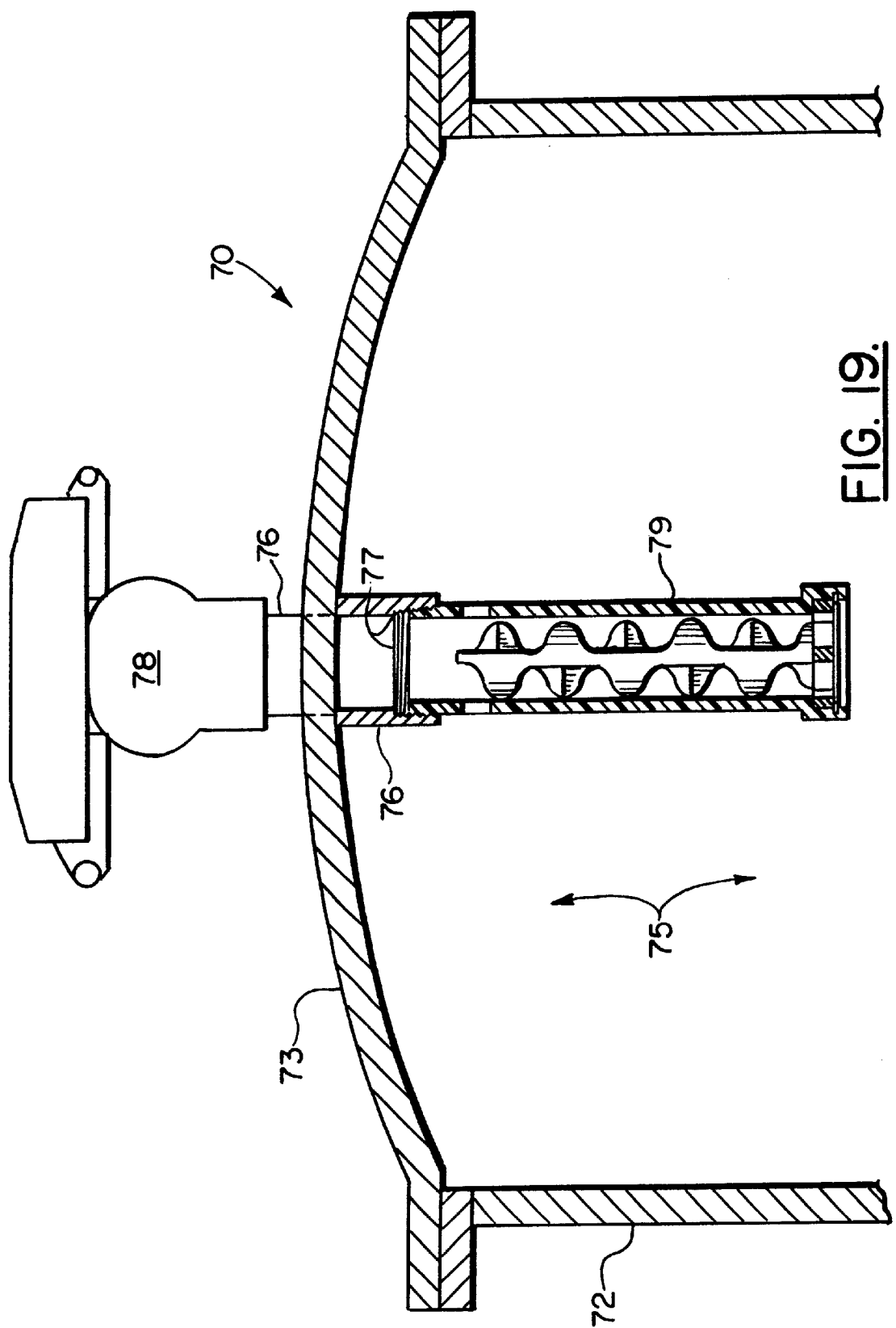
Figure 20:
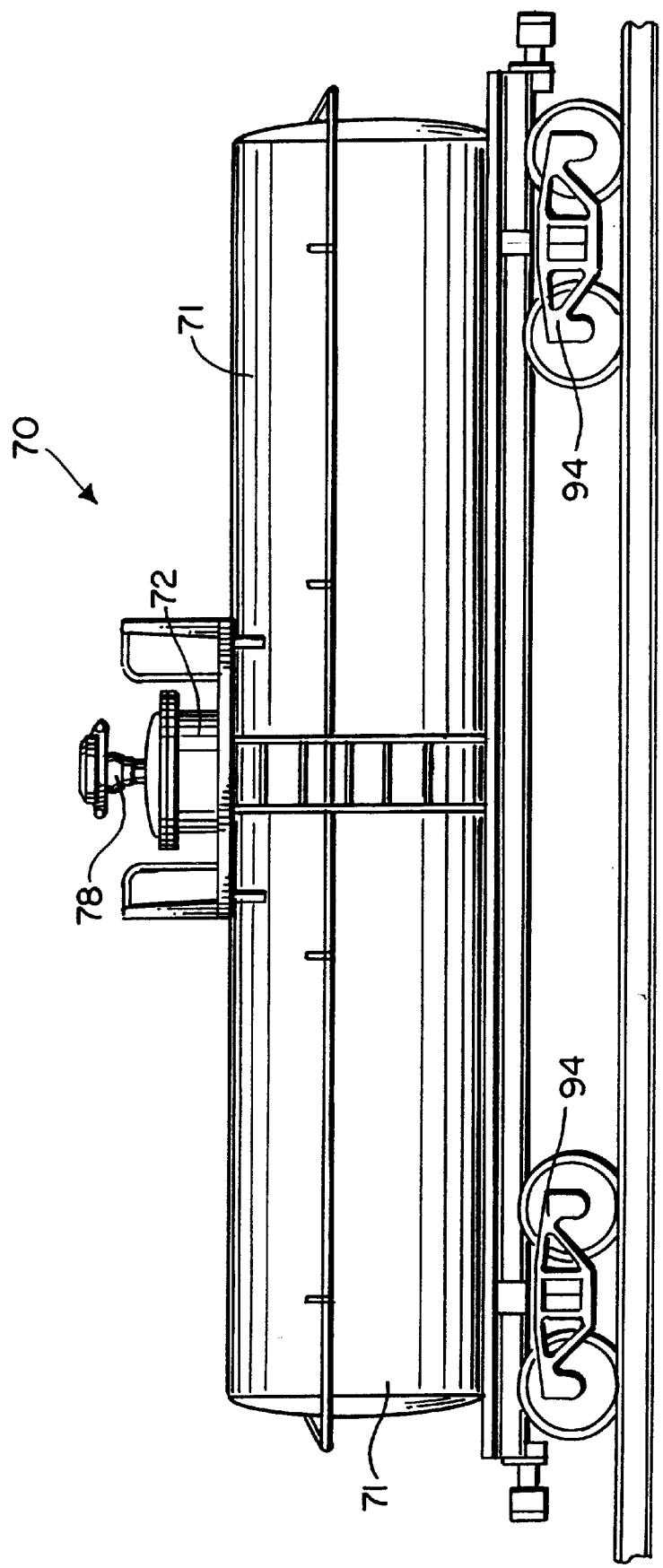
FIG. 20 is an elevation view of a common railroad tank car vehicle that can be seen more specifically in FIGS. 1, 2–3, 13, 18 and 19.

FIGS. 14–20 show a third embodiment of the apparatus of the present invention designated generally by the numeral 70 in FIGS. 18 and 19. Tank car 70 has a tank 71 supported by a known undercarriage 94. Tank 71 includes a projecting housing portion 72 and cover 73. Tank 71 has a generally cylindrically shaped interior 74. Projecting housing cover 72 has an interior 75. Interior 75 is occupied by fitting 76 that hangs from cover 73 as shown in FIGS. 18 and 19. Fitting 76 has internal threads 77 to which plastic fitting 79 attaches with a threaded connection as shown in FIG. 19. Thus, upper end portion 80 of plastic fitting 79 provides external threads 81 that form a threaded connection with the internal thread 77 of fitting 76.

Figure 14:
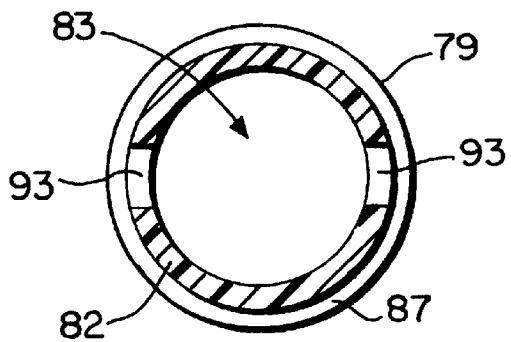
FIG. 14 is a top fragmentary view illustrating a third embodiment of the apparatus of the present invention.
Figure 15:
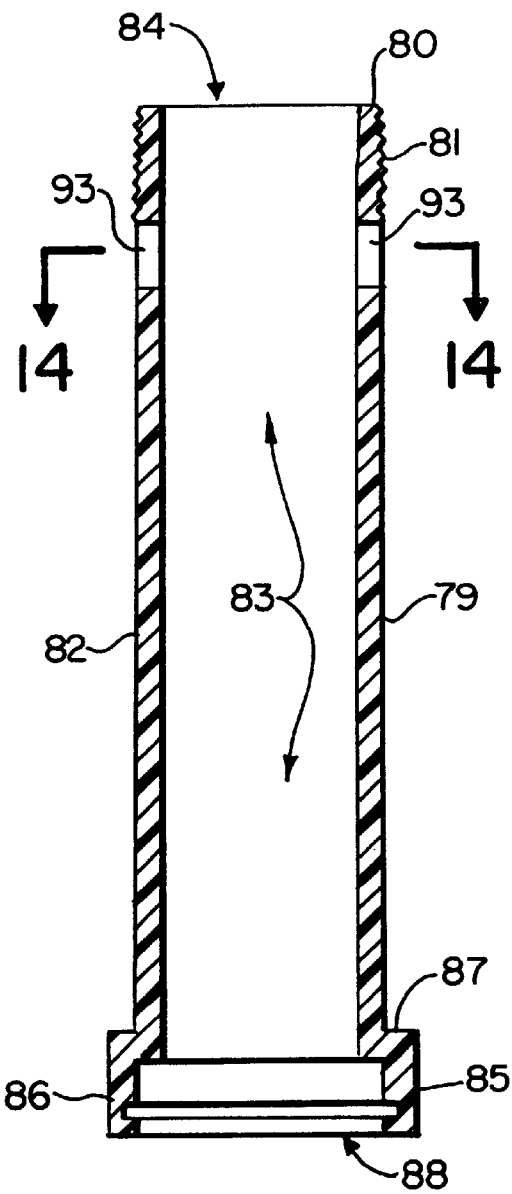
FIG. 15 is a sectional fragmentary view illustrating the second embodiment of the apparatus of the present invention.
Figure 16:
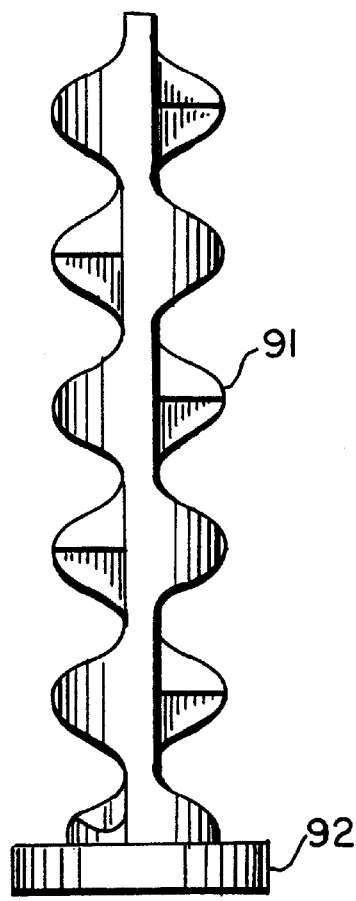
FIG. 16 is a side elevation view of the baffle portion of the third embodiment of the apparatus of the present invention.
Figure 17:
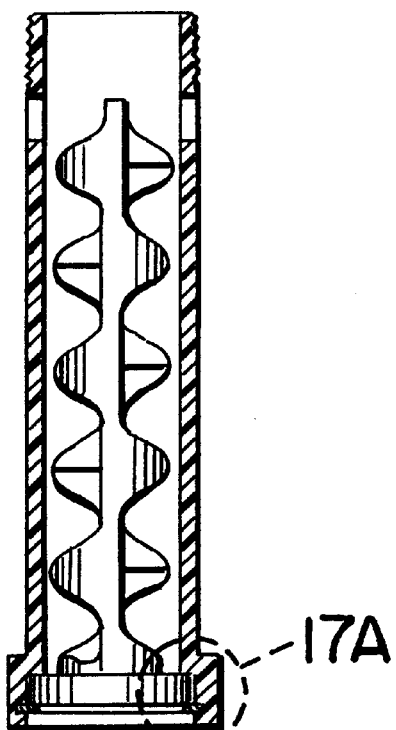
FIG. 17 is a partial section elevation view of the third embodiment of the apparatus of the present invention.
Figure 17A:
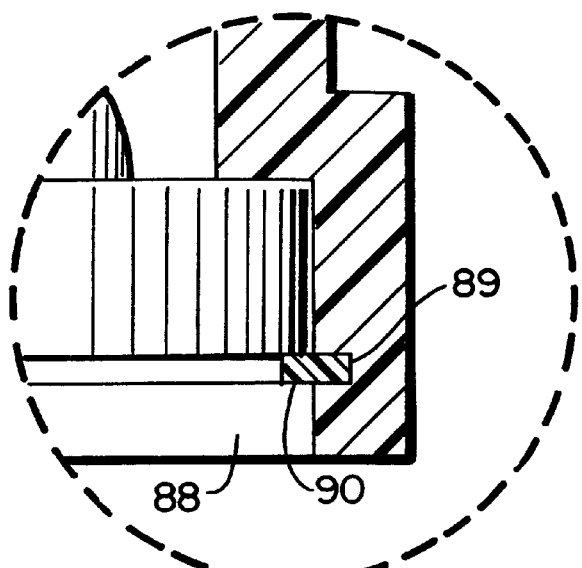
FIG. 17A is a fragmentary view of the third embodiment of the apparatus of the present invention.

Rupture disk assembly 78 is a conventional rupture disk assembly that is mounted above cover 73 in communication with fitting 76. In FIGS. 14–16, plastic fitting 79 has side wall 82, vertical bore 83, open top 84, and lower end portion 85. Lower end portion 85 includes an enlarged diameter section 86 having annular shoulder 87 and internal socket 88 that is a downwardly facing socket receptive of circular disk 92 of plastic surge protector element 91. Annular groove 89 can be fitted with removable retainer ring 90 that secures disk 92 and thus plastic surge protector element 91 inside of plastic fitting 79 as shown in FIGS. 18 and 19. Lateral ports 93 are provided in wall 82 of plastic fitting 79 as shown in FIGS. 14 and 15.

The baffle members (and the flange and the receiver) of the present invention can be made of Delrin® acetal resin, UHMW (ultra-high molecular weight polyethylene), polyethylene, and polypropylene, for example. Other materials which could be used are stainless steel, ABS, acrylic, Bakelite, CPVC, fiberglass, Kynar brand plastic, Lexan brand plastic, Micarta brand plastic, PVC, Ryton brand plastic, and Teflon brand polytetrafluoroethylene, though UHMW is preferred due to high toughness, low reactivity, and low cost.

PARTS LIST

The following is a summary list of parts and part descriptions used herein:

All measurements disclosed herein are at standard temperature and pressure, at sea level on Earth, unless indicated otherwise.

| PART NO. | DESCRIPTION |
| --- | --- |
| 10 | tank car |
| 11 | tank |
| 12 | cylindrical side wall |
| 13 | interior |
| 14 | liquid commodity |
| 15 | wave action |
| 16 | outlet fitting |
| 17 | inner cylindrical member |
| 18 | outer cylindrical member |
| 19 | vertical flow bore |
| 20 | flanged connection |
| 21 | rupture disk assembly |
| 22 | annular flange |
| 23 | plastic mounting flange |
| 24 | annular flange |
| 25 | bolted connection |
| 26 | cylindrical cavity |
| 27 | annular shoulder |
| 28 | arrow |
| 29 | arrow |
| 30 | plastic surge protector element |
| 31 | upper end |
| 32 | lower end |
| 33 | cylindrical cap |
| 34 | dimension arrow |
| 35 | core |
| 36 | baffle |
| 37 | baffle surfaces |
| 38 | bottom surface |
| 39 | passageway |
| 40 | flat surface |
| 41 | flat surface |
| 42 | thickness |
| 43 | thickness |
| 44 | edge |
| 45 | edge |
| 46 | opening |
| 47 | opening |
| 48 | curved surface |
| 49 | edge |
| 50 | tank car |
| 51 | tank |
| 52 | cylindrical side wall |
| 53 | interior |
| 54 | outlet fitting |
| 55 | cylindrical wall |
| 56 | annular flange |
| 57 | vertical bore |
| 58 | flange |
| 59 | bolted connection |
| 60 | plastic receiver |
| 61 | rupture disk assembly |
| 62 | plastic surge protector element |
| 63 | sidewall |
| 64 | bore |
| 65 | lateral port |
| 66 | flange |
| 67 | open ended socket |
| 68 | annular shoulder |
| 69 | opening |
| 70 | tank car |
| 71 | tank |
| 72 | projecting housing portion |
| 73 | cover |
| 74 | interior |
| 75 | interior |
| 76 | fitting |
| 77 | internal threads |
| 78 | rupture disk assembly |
| 79 | plastic fitting |
| 80 | upper end portion |
| 81 | external threads |
| 82 | sidewall |
| 83 | vertical bore |
| 84 | open top |
| 85 | lower end portion |
| 86 | enlarged diameter section |

-continued

| PART NO. | DESCRIPTION |
| --- | --- |
| 87 | annular shoulder |
| 88 | socket |
| 89 | annular groove |
| 90 | retainer ring |
| 91 | plastic surge protector element |
| 92 | circular disk |
| 93 | lateral port |
| 94 | undercarriage |

The foregoing embodiments are presented by way of example only; the scope of the present invention is to be limited only by the following claims.

What is claimed is:

1. A vehicle for transporting a liquid commodity, comprising:
   a) a closed tank, said tank having an inside surface, an outside surface, a top, a bottom and an interior for containing such liquid commodity;
   b) a safety vent mounted on the top of the tank at the outside surface, having a safety relief device for allowing pressure to escape from the tank in the event of a pressure build-up greater than a selected pressure value and including a flow line that extends between the valve and the tank interior, the flow line having a bore with a line of flow;
   c) a mechanical energy dissipation system for dissipating hydraulic hammer action in the safety vent, comprising:
      i) a mechanical device of a relatively small size in comparison to the size of the tank, said device being a plastic body located in the bore of the flow line, said device presenting a series of diverging, impact surfaces connected to said plastic body and extending at acute angles to the line of flow, the device extending from the tank to the valve to dissipate the hydraulic hammer action of the liquid as it flows through said flow line and device;
      ii) wherein the diverging, impact surfaces are made of a non-metallic plastic material, shaped such that they are strong enough to absorb mechanical energy without breaking.

2. The vehicle of claim 1, wherein said mechanical device occupies less than and extends into less than about one percent (1%) of the interior volume of the tank.

3. A vehicle for transporting a liquid commodity, comprising:
   a) a closed tank, said tank having an inside surface, an outside surface, a top, a bottom and an interior for containing such liquid commodity;
   b) a safety vent mounted on the top of the tank at the outside surface, having a safety relief valve for allowing pressure to escape from the tank in the event of a pressure build-up greater than a selected pressure value and including a flow line that extends between the valve and the tank interior, the flow line having a bore;
   c) a mechanical energy dissipation system for dissipating hydraulic hammer action in the safety vent, comprising:
      i) a mechanical device of a relatively small size in comparison to the size of the tank, said device being located in the bore of the flow line, said device presenting a series of diverging, impact surfaces to liquid flow from the tank to the valve that dissipates the hydraulic hammer action of the liquid as it flows through said flow line and device;
      ii) wherein the diverging, impact surfaces are made of a non-metallic plastic material, shaped such that they are strong enough to absorb mechanical energy without breaking;
      iii) wherein said mechanical device includes a one piece plastic body having a core; and said diverging, impact surfaces comprise a series of spaced apart projections in succession affixed to opposite sides of said core and integral therewith.

4. The vehicle of claim 3, wherein said projections are a series of spaced apart baffles.

5. The vehicle of claim 4, wherein each of said projections has a pair of surfaces that form an angle with each other.

6. The vehicle of claim 4, wherein said device occupies less than and extends into less than about one percent (1%) of the interior volume of the tank.

7. A mobile tank apparatus, comprising:
   a) a tank having an interior for carrying a liquid;
   b) a rupture disk assembly on the tank for allowing excess pressure to escape from the tank before the tank is fractured from the pressure, said assembly including a rupture disk member and a flow line extending between the rupture disk member and the tank interior, the flow line having a bore; and
   c) a mechanical energy dissipation system, for dissipating hydraulic hammer action in the tank and prior to a premature failure of the rupture disk member, said system comprising:
      i) a mechanical device of a relatively small size in comparison to the size of the tank, said device being located in the flow line bore, said device including a one piece integral plastic body that has a core with projections extending from the core that provide a series of diverging impact surfaces that dissipate the hydraulic hammer action of the liquid as it flows in the flow line and through said device.

8. The mobile tank apparatus of claim 7 wherein the diverging, impact surfaces are such that they are strong enough to absorb mechanical energy without breaking.

9. The mobile tank apparatus of claim 7, wherein said device occupies less than and extends into less than about one percent (1%) of the interior volume of the tank.

10. The mobile tank apparatus of claim 7, wherein said body is generally rectangular in shape, and said diverging, impact surfaces comprise a series of baffles in succession affixed to and longitudinally spaced along opposite sides of the rectangular body.

11. The mobile tank apparatus of claim 10, wherein said baffles are a series of projections, each projection having a pair of surfaces that together form an acute angle.

12. The mobile tank apparatus of claim 10, wherein said device occupies less than and extends into less than about one percent (1%) of the interior volume of the tank.

13. A method of dissipating the hydraulic hammer action in a moving tank carrying a liquid load, the tank having a flow line with a bore that contains a safety relief valve, comprising the steps of:
   (a) providing a relatively small mechanical energy dissipation device comprising a plastic device that is contained within the flow line bore and including a central body that has a plurality of projections extending from the body toward the flow line, each projection having impact surfaces; and
   (b) placing said mechanical device in the flow line so that the device occupies the bore and extends between the liquid load in the tank and the safety relief valve, causing liquid of the liquid load to have to pass through said flow line bore and mechanical device before it can reach said safety relief valve, with said device occupying less than and extending into less than about one percent (1%) of the interior volume of the tank, the kinetic energy of the moving liquid being dissipated as it passes through said device impacting against said diverging surfaces, dissipating the hydraulic hammer action;

c) wherein in step "b", the diverging, impact surfaces are made of a non-metallic material.

14. The method of claim 13 wherein the diverging, impact surfaces are made of plastic.

15. The method of claim 13 wherein the diverging, impact surfaces are strong enough to absorb the kinetic energy of the moving liquid without breaking.

16. The method of claim 14 wherein the diverging, impact surfaces are strong enough to absorb the kinetic energy of the moving liquid without breaking.

17. The method of claim 13 wherein the diverging, impact surfaces are shaped such that they are strong enough to absorb the kinetic energy of the moving liquid without breaking.

18. A railroad tank car vehicle comprising:

a) a closed tank, said tank having an inside surface, an outside surface, a top and a bottom, and an interior for containing a liquid commodity of thousands of gallons in capacity;

b) a safety vent flow line mounted on the top of the tank at the outside surface having a safety relief valve for allowing pressure to escape from the tank in the event of a pressure build-up greater than the tank is rated for and before the tank could fracture, the flow line extending from the top of the tank into the interior of the tank and being used to allow the excess pressure to escape from the tank once the pressure has exceeded a rated burst pressure;

c) a mechanical energy dissipation system for dissipating the hydraulic hammer action in the safety vent flow line, protecting the safety relief valve from premature operation, comprising:

a longitudinally extended mechanical device of a relatively small size in comparison to the size of the tank, said device being located in the flow line, the device extending in the flow line between the safety relief valve and the liquid commodity in the tank, said device comprising a one piece plastic body that has a core and a series of diverging, energy dissipating impact surfaces extending from the core, significantly dissipating the hydraulic hammer action of the liquid from the impact of the liquid against the impact surfaces as it flows through said device before it encounters the valve the size, placement and configuration of said device, and said impact surfaces providing kinetic energy dissipation means for causing said device to allow flow of the liquid from the tank to the valve through the interior of said device in a way to significantly dissipate the kinetic energy generated by the hydraulic hammer caused by the sudden movement of thousands of gallons of liquid in the tank as part of the liquid moves through said device on its way to the valve, wherein the diverging, impact surfaces are made of a non-metallic material and/or the diverging, impact surfaces are shaped such that they could be made of plastic yet still be strong enough to absorb mechanical energy without breaking.

19. The method of claim 14, wherein said mechanical device occupies less than and extends into less than about one percent (1%) of the interior volume of the tank.

20. A vehicle for transporting a liquid commodity comprising:

a) a closed tank for containing such liquid commodity, said tank having an inside surface, an outside surface, a top and a bottom and an interior for containing thousands of gallons in capacity;

b) a safety vent flow line having a bore, the safety vent flow line being mounted on the top of the tank at the outside surface and having a safety relief valve for allowing pressure to escape from the tank in the event of a pressure build-up greater than the tank is rated for and before the tank could fracture;

c) a mechanical energy dissipation system for dissipating hydraulic hammer action in the safety vent flow line that includes a longitudinally extended one piece, plastic mechanical device of a relatively small size in comparison to the size of the tank, said device having a top flange near its top area for connecting the device to the safety vent and for positioning its lower end down into the flow line and next to the tank interior, the device having an upper end being positioned next to the safety relief valve, said body including a series of diverging, energy dissipating impact surfaces to the liquid flow from the tank to the valve, for significantly dissipating the hydraulic hammer action of the liquid from the impact of the liquid against the impact surfaces as it flows through flow line and said device before it encounters the valve, the size, placement and configuration of said device, said impact surfaces and its top flange providing kinetic energy dissipation means for causing said device to allow flow of the liquid from the tank to the valve through the interior of said device in a way to significantly dissipate the kinetic energy generated by the hydraulic hammer caused by the sudden movement of thousands of gallons of liquid in the tank as part of the liquid moves through said device on its way to the valve.

21. A railroad tank car for carrying a liquid load comprising:

a) a tank having an interior for containing said liquid load;

b) a rupture disk assembly that includes a flow line with a bore and a rupture disk member, for allowing some of the liquid load to escape from the tank interior before the tank is fractured from excess pressure;

c) a mechanical energy dissipation system for dissipating hydraulic hammer action in the tank, comprising an integral plastic mechanical device of a relatively small size in comparison to the size of the tank comprising a plastic body removably occupying the flow line bore, said device having a plurality of projections presenting a series of diverging, energy dissipating impact surfaces to the liquid flow from the tank to the rupture disk assembly, significantly dissipating the hydraulic hammer action of the liquid from the impact of the liquid against the impact surfaces as it flows through said device wherein the projections and impact surfaces are made of a plastic material that is strong enough to absorb mechanical energy without breaking.

22. The vehicle of claim 1 wherein the plastic material is from the group consisting of Delrin® acetal resin, UHMW (ultra-high molecular weight polyethylene), polyethylene, polypropylene, ABS, acrylic, Bakelite, CPVC, fiberglass, Kynax brand plastic, Lexan brand plastic, Micarta brand plastic, PVC, Ryton brand plastic, and Teflon brand polytetrafluoroethylene.

23. The vehicle of claim 7 wherein the mechanical device is of a plastic material that is from the group consisting of Delrin® acetal resin, UHMW (ultra-high molecular weight polyethylene), polyethylene, polypropylene, ABS, acrylic, Bakelite, CPVC, fiberglass, Kynar brand plastic, Lexan brand plastic, Micarta brand plastic, PVC, Ryton brand plastic, and Teflon brand polytetrafluoroethylene.

24. The method of claim 13 wherein in step "c" the non-metallic material is a plastic material that is from the group consisting of Deirin® acetal resin, UHMW (ultra-high molecular weight polyethylene), polyethylene, polypropylene, ABS, acrylic, Bakelite, CPVC, fiberglass, Kynar brand plastic, Lexan brand plastic, Micarta brand plastic, PVC, Ryton brand plastic, and Teflon brand polytetrafluoroethylene.

25. The vehicle of claim 18 wherein the plastic body is of a plastic material that is from the group consisting of Delrin® acetal resin, UHMW (ultra-high molecular weight polyethylene), polyethylene, polypropylene, ABS, acrylic, Bakelite, CPVC, fiberglass, Kynar brand plastic, Lexan brand plastic, Micarta brand plastic, PVC, Ryton brand plastic, and Teflon brand polytetrafluoroethylene.

26. The vehicle of claim 20 wherein the mechanical device is of a plastic material that is from the group consisting of Delrin® acetal resin, UHMW (ultra-high molecular weight polyethylene), polyethylene, polypropylene, ABS, acrylic, Bakelite, CPVC, fiberglass, Kynar brand plastic, Lexan brand plastic, Micarta brand plastic, PVC, Ryton brand plastic, and Teflon brand polytetrafluoroethylene.

27. The vehicle of claim 1 wherein the mechanical device is of a plastic material that is from the group consisting of Delrin® acetal resin, UHMW (ultra-high molecular weight polyethylene), polyethylene, polypropylene, ABS, acrylic, Bakelite, CPVC, fiberglass, Kynar brand plastic, Lexan brand plastic, Micarta brand plastic, PVC, Ryton brand plastic, and Teflon brand polytetrafluoroethylene.

28. A vehicle for transporting a liquid commodity, comprising:
   a) a mobile tank, said tank having an inside surface, an outside surface, a top, a bottom and an interior for containing such liquid commodity;
   b) a safety vent mounted on the top of the tank at the outside surface, having a safety relief valve for allowing pressure to escape from the tank in the event of a pressure build-up greater than a selected pressure value and a flow line extending between the valve and the tank interior, the flow line having a bore;
   c) a mechanical energy dissipation system for dissipating hydraulic hammer action in the safety vent, comprising:
      i) a plastic device of relatively small size in comparison to the size of the tank, said device being removably located in the flow line bore, said device being contained within the flow line bore and including a central body that has a plurality of projections extending from the body toward the flow line, each projection having impact surfaces.

29. The vehicle of claim 28 wherein at least two of the impact surfaces form an acute angle with the line of flow.

30. The vehicle of claim 29 wherein the acute angle is less than about 60 degrees.

31. A vehicle for transporting a liquid commodity, comprising:
   a) a mobile tank, said tank having an inside surface, an outside surface, a top, a bottom and an interior for containing such liquid commodity;
   b) a safety vent mounted on the top of the tank at the outside surface, having a safety relief valve for allowing pressure to escape from the tank in the event of a pressure build-up greater than a selected pressure value and a flow line extending between the valve and the tank interior, the flow line having a bore;
   c) a mechanical energy dissipation system for dissipating hydraulic hammer action in the safety vent, comprising:
      i) a plastic device of relatively small size in comparison to the size of the tank, said device being removably located in the flow line bore, said device presenting a series of diverging, impact surfaces to liquid flow from the tank to the valve member that dissipates the hydraulic hammer action of the liquid as it flows through the line of flow and the device during use;
      ii) wherein the diverging, impact surfaces are defined by a plurality of projections;
      iii) wherein said device includes a one piece plastic body having a core, and said diverging, impact surfaces comprise a series of spaced apart projections in succession affixed to opposite sides of said core.

32. The vehicle of claim 31, wherein each of said projections has a pair of surfaces that form an angle with each other.

33. The vehicle of claim 28 wherein the diverging, impact surfaces are such that they are strong enough to absorb mechanical energy without breaking.

34. The vehicle of claim 28, wherein said device occupies less than and extends into less than about one percent (1%) of the interior volume of the tank.

35. The vehicle of claim 28 wherein the plastic material is from the group consisting of Delrin® acetal resin, UHMW (ultra-high molecular weight polyethylene), polyethylene, polypropylene, ABS, acrylic, Bakelite, CPVC, fiberglass, Kynar brand plastic, Lexan brand plastic, Micarta brand plastic, PVC, Ryton brand plastic, and Teflon brand polytetrafluoroethylene.

36. A vehicle for transporting a liquid commodity, comprising:
   a) a mobile tank, said tank having an inside surface, an outside surface, a top, a bottom and an interior for containing such liquid commodity;
   b) a safety vent mounted on the top of the tank at the outside surface, having a safety relief valve for allowing pressure to escape from the tank in the event of a pressure build-up greater than a selected pressure value and a flow line extending between the valve and the tank interior, the flow line having a bore with a line of flow;
   c) a mechanical energy dissipation system for dissipating hydraulic hammer action in the safety vent, comprising a plastic device that is contained within the flow line bore and including a central body that has a plurality of projections extending from the body toward the flow line, each projection having impact surfaces.

37. The vehicle of claim 36 wherein at least two of the impact surfaces form an acute angle with the line of flow.

38. The vehicle of claim 37 wherein the acute angle is less than about 60 degrees.

39. The vehicle of claim 36, wherein said device includes a one piece plastic body, and said impact surfaces comprise a series of spaced apart projections in succession affixed to opposite sides of said body and integral therewith.

40. The vehicle of claim 39, wherein each of said projections has a pair of surfaces that form an angle with each other.

41. The vehicle of claim 39 wherein the diverging, impact surfaces are such that they are strong enough to absorb mechanical energy without breaking.

42. The mobile tank of claim 36, wherein said device occupies less than and extends into less than about one percent (1%) of the interior volume of the tank.

43. The vehicle of claim 36 wherein the plastic device is of a plastic material from the group consisting of Delrin® acetal resin, UHMW (ultra-high molecular weight polyethylene), polyethylene, polypropylene, ABS, acrylic, Bakelite, CPVC, fiberglass, Kynar brand plastic, Lexan brand plastic, Micarta brand plastic, PVC, Ryton brand plastic, and Teflon brand polytetrafluoroethylene.

* * * * *